DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 16, 1969

869 O.G. 713

T869,012

PHYSICAL DEVELOPMENT SYSTEMS

David C. Shuman and Thomas H. James, both of Kodak Park Works, Rochester, N.Y. 14650

Filed July 9, 1969, Ser. No. 840,485

Int. Cl. G03c *5/30, 5/24, 5/54*

U.S. Cl. 96—50

No Drawing. 10 Pages Specification

The speed of obtaining physically developed silver images is enhanced by using physical developer systems employing an ascorbic acid as the only developing agent in conjunction with certain noble metal nuclei such as silver, gold or palladium. For increasing the speed of the process, it is preferred to have the noble metal nuclei particles between about 10 to 100 A. in diameter. Typical physical development systems include diffusion transfer processes in which an exposed and developing silver halide emulsion is contacted with a silver halide solvent and silver precipitating nuclei to form an image on a receiving sheet and also systems in which nuclei are formed or made active sites by the action of light. Ascorbic acid has the additional advantage in that as the reducing agent remaining in the photographic material after processing, it does not decompose causing stain.